United States Patent
Cheng et al.

(10) Patent No.: US 11,356,510 B2
(45) Date of Patent: Jun. 7, 2022

(54) CONTROL SYSTEM AND CONTROL METHOD OF UNMANNED ENGINEERING MACHINERY

(71) Applicant: BEIJING BAIDU NETCOM SCIENCE AND TECHNOLOGY CO., LTD., Beijing (CN)

(72) Inventors: Xinjing Cheng, Beijing (CN); Ruigang Yang, Beijing (CN); Hao Xu, Beijing (CN); Feixiang Lu, Beijing (CN); Yajue Yang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 223 days.

(21) Appl. No.: 16/726,549

(22) Filed: Dec. 24, 2019

(65) Prior Publication Data
US 2020/0213396 A1    Jul. 2, 2020

(30) Foreign Application Priority Data
Dec. 26, 2018 (CN) .......................... 201811604238.X

(51) Int. Cl.
*H04L 67/12*     (2022.01)
*G05B 19/4155*   (2006.01)

(52) U.S. Cl.
CPC .......... *H04L 67/12* (2013.01); *G05B 19/4155* (2013.01); *G05B 2219/31393* (2013.01)

(58) Field of Classification Search
None
See application file for complete search history.

(56) References Cited

U.S. PATENT DOCUMENTS

| | | | |
|---|---|---|---|
| 2006/0212168 A1* | 9/2006 | Baba | B25J 9/0087 700/245 |
| 2009/0056964 A1* | 3/2009 | Kunizawa | E02F 3/7618 172/823 |
| 2016/0032947 A1* | 2/2016 | Tanaka | E02F 3/435 60/429 |

FOREIGN PATENT DOCUMENTS

| | | | |
|---|---|---|---|
| CN | 104476548 A | * 4/2015 | ............ B25J 13/06 |
| CN | 205750425 U | 11/2016 | |

OTHER PUBLICATIONS

Chinese Patent Application No. 201811604238.X, Office Action dated Mar. 3, 2020, 6 pages.
Chinese Patent Application No. 201811604238.X, English translation of Office Action dated Mar. 3, 2020, 8 pages.

* cited by examiner

*Primary Examiner* — Charles E Anya
(74) *Attorney, Agent, or Firm* — Lathrop GPM LLP

(57) ABSTRACT

Embodiments of the present disclosure disclose a control system and a control method of an unmanned engineering machinery. The system includes at least a slave computer, a master computer and an execution device. The slave computer is configured to receive a current sensing value fed back by a sensing device in the unmanned engineering machinery, and to send the current sensing value to the master computer. The master computer is configured to generate a control instruction according to the current sensing value and a predetermined target sensing value of the sensing device, and to send the control instruction to the execution device through the slave computer.

14 Claims, 2 Drawing Sheets

---

S401
receiving, by a slave computer of the unmanned engineering machinery, a current sensing value fed back by a sensing device, sending, by the slave computer, the current sensing value to a master computer of the unmanned engineering machinery S402
generating, by the master computer, a control instruction according to the current sensing value and a predetermined target sensing value of the sensing device, sending, by the master computer, the control instruction to an execution device of the unmanned engineering machinery through the slave computer S403
performing, by the execution device, a control operation corresponding to the control instruction on the unmanned engineering machinery

CONTROL SYSTEM AND CONTROL METHOD OF UNMANNED ENGINEERING MACHINERY

CROSS-REFERENCE TO RELATED APPLICATION

This application claims priority to and benefits of Chinese Patent Application Serial No. 201811604238.X, filed with the State Intellectual Property Office of P. R. China on Dec. 26, 2018, the entire content of which is incorporated herein by reference.

FIELD

Embodiments of the present disclosure relate to the technical field of computer application, and more particularly, to a control system and a control method of an unmanned engineering machinery.

BACKGROUND

With the rapid development of AI (artificial intelligence) technology, unmanned engineering machinery with various functions is available, so that safety of construction and accuracy of control may be improved. Visually, the unmanned engineering machinery consists of a working device, an upper rotary table, a slewing device and a walking device. The working device, hinged by a movable arm, a bucket rod and a bucket, is a device in the engineering machinery that directly completes an excavation task. The slewing device is a device for controlling the working device and the upper rotary table to turn left or right. The walking device is a device for driving the engineering machinery to move forward, to move backward or to make a turn.

During the working process of the unmanned engineering machinery, the working device, the upper rotary table, the slewing device and the walking device may be operated under the control of a control system.

SUMMARY

Embodiments of the present disclosure provide a control system of an unmanned engineering machinery, including a slave computer, a master computer and an execution device. The slave computer is configured to receive a current sensing value fed back by a sensing device in the unmanned engineering machinery, and to send the current sensing value to the master computer. The master computer is configured to generate a control instruction according to the current sensing value and a predetermined target sensing value of the sensing device, and to send the control instruction to the execution device through the slave computer. The execution device is configured to perform a control operation corresponding to the control instruction on the unmanned engineering machinery.

Embodiments of the present disclosure provides a control method of an unmanned engineering machinery, including: receiving, by a slave computer of the unmanned engineering machinery, a current sensing value fed back by a sensing device; sending, by the slave computer, the current sensing value to a master computer of the unmanned engineering machinery; generating, by the master computer, a control instruction according to the current sensing value and a predetermined target sensing value of the sensing device; sending, by the master computer, the control instruction to an execution device of the unmanned engineering machinery through the slave computer; and performing, by the execution device, a control operation corresponding to the control instruction on the unmanned engineering machinery.

DETAILED DESCRIPTION

The present disclosure will be described in detail below with reference to the accompanying drawings and the embodiments. It should be understood that, the specific embodiments described herein are only used to explain the present disclosure rather than to limit the present disclosure. In addition, it should also be noted that, for convenience of description, only certain parts but not all contents related to the present disclosure are illustrated in the accompanying drawings.

During the working process of the unmanned engineering machinery, the working device, the upper rotary table, the slewing device and the walking device may be operated under the control of a control system. Generally, the control system of the unmanned engineering machinery in the related art includes: an encoder and a controller. The encoder may be installed in each part of the working device and the slewing device of the unmanned engineering machinery. When the encoder is installed, each part needs to be processed and modified, which may significantly affect the performance of the engineering machinery and reduce the accuracy of the control system.

Embodiments of the present disclosure provide a control system and a control method of an unmanned engineering machinery that help solve some of these problems.

Embodiment 1

Figure 1:
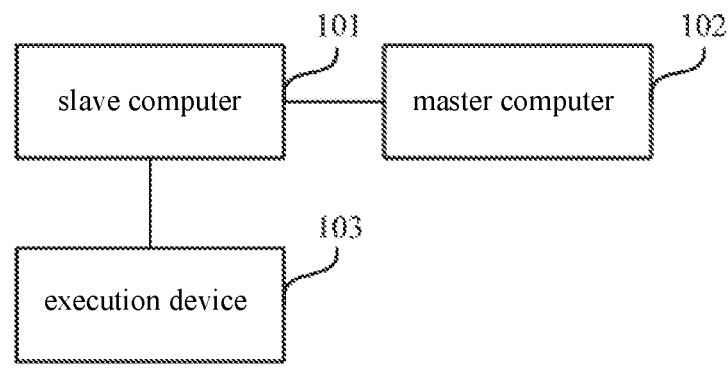
FIG. 1 is a schematic diagram of a control system of an unmanned engineering machinery according to embodiment 1 of the present disclosure.

FIG. 1 is a schematic diagram of a control system of an unmanned engineering machinery according to embodiment 1 of the present disclosure. As illustrated in FIG. 1, the control system of the unmanned engineering machinery may include a slave computer 101, a master computer 102 and an execution device 103.

The slave computer 101 is configured to receive a current sensing value fed back by a sensing device in the unmanned engineering machinery, and to send the current sensing value fed back by the sensing device to the master computer.

The master computer 102 is configured to generate a control instruction according to the current sensing value fed back by the sensing device and a predetermined target sensing value of the sensing device, and to send the control instruction to the execution device through the slave computer.

The execution device 103 is configured to perform a control operation corresponding to the control instruction on the unmanned engineering machinery.

Embodiments of the present disclosure provide the control system of the unmanned engineering machinery. Firstly, the slave computer receives the current sensing value fed back by the sensing device in the unmanned engineering machinery, and sends the current sensing value fed back by the sensing device to the master computer. And then, the master computer generates the control instruction according to the current sensing value fed back by the sensing device and the predetermined target sensing value of the sensing device, and sends the control instruction to the execution device through the slave computer. Finally, the execution device performs the control operation corresponding to the control instruction on the unmanned engineering machinery. Generally, a control system of an unmanned engineering machinery in the related art includes an encoder and a controller. The encoder may be installed in each part of a working device and a slewing device of the unmanned engineering machinery. When the encoder is installed, each part needs to be processed and modified, which may greatly affect the performance of the engineering machinery and reduce the accuracy of the control system. Consequently, compared with the related art, the control system of the unmanned engineering machinery provided in the embodiments of the present disclosure may improve the accuracy of the control system convenience of installation and operation reliability. In addition, technical solutions according to embodiments of the present disclosure are simple to be implemented and easy for popularization, and have a wider application range.

Embodiment 2

Figure 2:
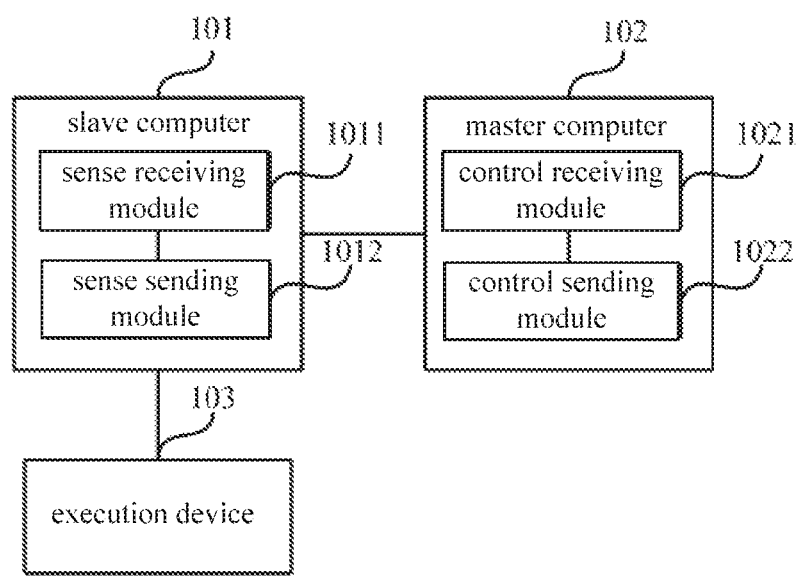
FIG. 2 is a schematic diagram of a control system of an unmanned engineering machinery according to embodiment 2 of the present disclosure.

FIG. 2 is a schematic diagram of a control system of an unmanned engineering machinery according to embodiment 2 of the present disclosure. As illustrated in FIG. 2, the slave computer 101 includes a sense receiving module 1011 and a sense sending module 1012.

The sense receiving module 1011 is configured to receive the current sensing value fed back by the sensing device in the unmanned engineering machinery, and to send the current sensing value fed back by the sensing device to the sense sending module 1012. The sensing device includes at least one first sensing device in a working device of the unmanned engineering machinery and at least one second sensing device in a slewing device of the unmanned engineering machinery.

The sense sending module 1012 is configured to receive the current sensing value sent from the sense receiving module 1011, and to send the current sensing value to the master computer 102.

In an embodiment of the present disclosure, the master computer 102 includes a control receiving module 1021 and a control sending module 1022.

The control receiving module 1021 is configured to receive the current sensing value sent from the sense sending module 1012, to generate the control instruction according to the current sensing value and the predetermined target sensing value of the sensing device, and to send the control instruction to the control sending module 1022.

The control sending module 1022 is configured to receive the control instruction sent from the control receiving module 1021, and to send the control instruction to the execution device 103.

In detail, the sense receiving module 1011 is configured to receive a first current sensing value fed back by the at least one first sensing device in the working device of the unmanned engineering machinery and a second current sensing value fed back by the at least one second sensing device in the slewing device of the unmanned engineering machinery, and to send the first current sensing value fed back by the at least one first sensing device and the second current sensing value fed back by the at least one second sensing device to the sense sending module 1012.

The sense sending module 1012 is configured to receive the first current sensing value fed back by the at least one first sensing device and the second current sensing value fed back by the at least one second sensing device that are sent from the sense receiving module 1011, and to send the first current sensing value and the second current sensing value to the master computer 102.

In an embodiment of the present disclosure, the control receiving module 1021 is configured to receive the first current sensing value fed back by the at least one first sensing device and the second current sensing value fed back by the at least one second sensing device that are sent from the sense sending module 1012, to generate at least one first control instruction according to the first current sensing value fed back by the at least one first sensing device and a predetermined first target sensing value of the at least one first sensing device, to generate at least one second control instruction according to the second current sensing value fed back by the at least one second sensing device and a predetermined second target sensing value of the at least one second sensing device, and to send the at least one first control instruction and the at least one second control instruction to the control sending module 1022.

The control sending module 1022 is configured to receive the at least one first control instruction and the at least one second control instruction that are sent from the control receiving module 1021, and to send the at least one first control instruction and the at least one second control instruction to the execution device 103 through the slave computer 101.

Embodiments of the present disclosure provide the control system of the unmanned engineering machinery. Firstly, the slave computer receives the current sensing value fed back by the sensing device in the unmanned engineering machinery, and sends the current sensing value fed back by the sensing device to the master computer. And then, the master computer generates the control instruction according to the current sensing value fed back by the sensing device and the predetermined target sensing value of the sensing device, and sends the control instruction to the execution device through the slave computer. Finally, the execution device performs the control operation corresponding to the control instruction on the unmanned engineering machinery. Generally, a control system of an existing unmanned engineering machinery include: an encoder and a controller. The encoder may be installed in each part of the working device and the slewing device of the unmanned engineering machinery. When the encoder is installed, each part needs to be processed and modified, which may greatly affect the performance of the engineering machinery and reduce the accuracy of the control system. Consequently, compared with the related art, the control system of the unmanned engineering machinery provided in the embodiments of the present disclosure may improve the accuracy of the control system, convenience of installation and operation reliability. In addition, technical solutions according to embodiments of the present disclosure are simple to be implemented and easy for popularization, and have a wider application range.

Embodiment 3

Figure 3:
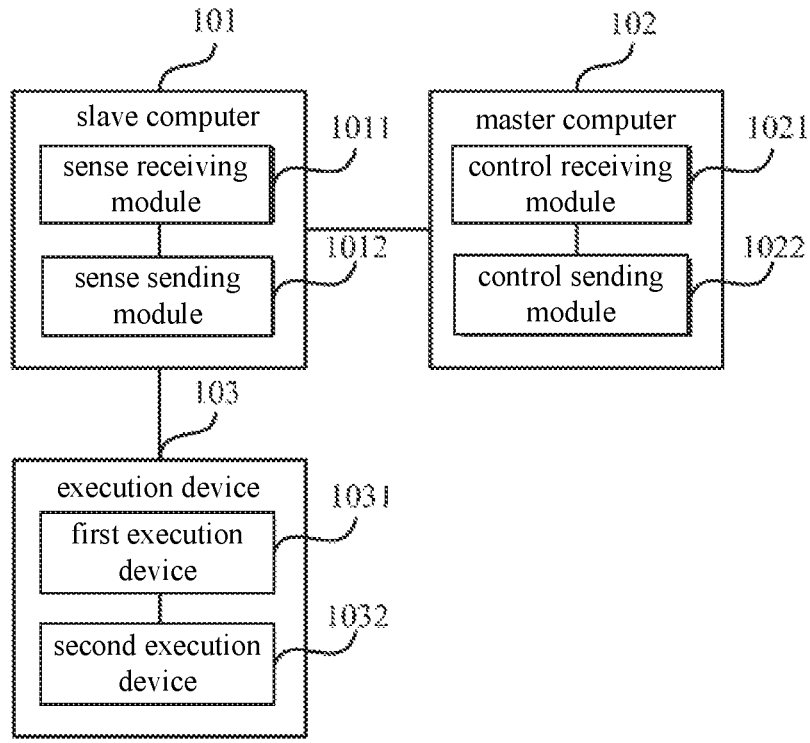
FIG. 3 is a schematic diagram of a control system of an unmanned engineering machinery according to embodiment 3 of the present disclosure.

FIG. 3 is a schematic diagram of a control system of an unmanned engineering machinery according to embodiment 3 of the present disclosure. As illustrated in FIG. 3, the execution device 103 includes a first execution device 1031 and a second execution device 1032.

The first execution device 1031 is configured to receive the at least one first control instruction sent from the control sending module 1022 through the slave computer 101, to perform a control operation corresponding to the at least one first control instruction on the working device of the unmanned engineering machinery. The first control instruction includes a first opening control instruction and a first closing control instruction.

The second execution device 1032 is configured to receive the at least one second control instruction sent from the control sending module 1022 through the slave computer 101, to perform a control operation corresponding to the at least one second control instruction on the slewing device of the unmanned engineering machinery. The second control instruction includes a second opening control instruction and a second closing control instruction.

In an embodiment of the present disclosure, the first execution device 1031 is configured to pen an electromagnetic valve in the working device of the unmanned engineering machinery when an output value of the at least one first control instruction is a first output value, and to close the electromagnetic valve in the working device of the unmanned engineering machinery when the output value of the at least one first control instruction is a second output value. Alternatively, the first execution device 1031 is configured to close the electromagnetic valve in the working device of the unmanned engineering machinery when the output value of the at least one first control instruction is the first output value, and to open the electromagnetic valve in the working device of the unmanned engineering machinery when the output value of the at least one first control instruction is the second output value.

The second execution device 1032 is configured to open an electromagnetic valve in the slewing device of the unmanned engineering machinery when an output value of the at least one second control instruction is the first output value, and to close the electromagnetic valve in the slewing device of the unmanned engineering machinery when the output value of the at least one second control instruction is the second output value. Alternatively, the second execution device 1032 is configured to close the electromagnetic valve in the slewing device of the unmanned engineering machinery when the output value of the at least one second control instruction is the first output value, and to open the electromagnetic valve in the slewing device of the unmanned engineering machinery when the output value of the at least one second control instruction is the second output value.

In an embodiment of the present disclosure, the at least one first sensing device includes a first draw-wire displacement sensor, a second draw-wire displacement sensor and a third draw-wire displacement sensor. The at least one second sensing device includes a rotating potentiometer. The first draw-wire displacement sensor is arranged at a first joint of the working device of the unmanned engineering machinery, the second draw-wire displacement sensor is arranged at a second joint of the working device of the unmanned engineering machinery, the third draw-wire displacement sensor is arranged at a third joint of the working device of the unmanned engineering machinery, and the rotating potentiometer is arranged at a specific joint of the slewing device of the unmanned engineering machinery.

Embodiments of the present disclosure provide the control system of the unmanned engineering machinery. Firstly, the slave computer receives the current sensing value fed back by the sensing device in the unmanned engineering machinery, and sends the current sensing value fed back by the sensing device to the master computer. And then, the master computer generates the control instruction according to the current sensing value fed back by the sensing device and the predetermined target sensing value of the sensing device, and sends the control instruction to the execution device through the slave computer. Finally, the execution device performs the control operation corresponding to the control instruction on the unmanned engineering machinery. Generally, a control system of an existing unmanned engineering machinery include: an encoder and a controller. The encoder may be installed in each part of the working device and the slewing device of the unmanned engineering machinery. When the encoder is installed, each part needs to be processed and modified, which may greatly affect the performance of the engineering machinery and reduce the accuracy of the control system. Consequently, compared with the related art, the control system of the unmanned engineering machinery provided in the embodiments of the present disclosure may improve the accuracy of the control system, convenience of installation and operation reliability. In addition, technical solutions according to embodiments of the present disclosure are simple to be implemented and easy for popularization, and have a wider application range.

Embodiment 4

Figure 4:
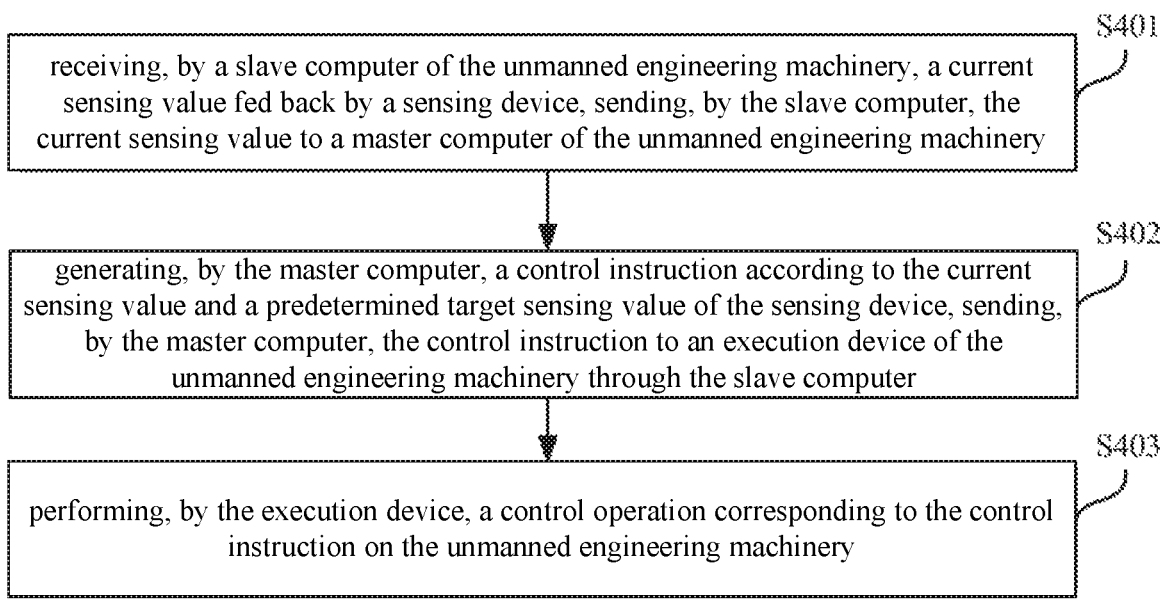
FIG. 4 is a flowchart of a control method of an unmanned engineering machinery according to embodiment 4 of the present disclosure.

FIG. 4 is a flowchart of a control method of an unmanned engineering machinery according to embodiment 4 of the present disclosure. As illustrated in FIG. 4, the control method of the unmanned engineering machinery includes the following.

At block S401, the slave computer of the unmanned engineering machinery receives a current sensing value fed back by a sensing device, and sends the current sensing value fed back by the sensing device to the master computer of the unmanned engineering machinery.

In an embodiment of the present disclosure, the slave computer may include a sense receiving module and a sense sending module. The sense receiving module is configured to receive the current sensing value fed back by the sensing device in the unmanned engineering machinery, and to send the current sensing value fed back by the sensing device to the sense sending module. The sensing device includes at least one first sensing device in a working device of the unmanned engineering machinery and at least one second sensing device in the slewing device of the unmanned engineering machinery. The sense sending module is configured to receive the current sensing value sent from the sense receiving module, and to send the current sensing value to the master computer.

In an embodiment of the present disclosure, the sense receiving module receives a first current sensing value fed back by the at least one first sensing device in the working device of the unmanned engineering machinery and a second current sensing value fed back by the at least one second sensing device in the slewing device of the unmanned engineering machinery. The control receiving module sends the first current sensing value fed back by the at least one first sensing device and the second current sensing value fed back by the at least one second sensing device to the sense sending module. The sense sending module receives the first current sensing value fed back by the at least one first sensing device and the second current sensing value fed back by the at least one second sensing device that are sent from the sense receiving module. The control receiving module sends the first current sensing value fed back by the at least one first sensing device and the second current sensing value fed back by the at least one second sensing device to the master computer.

In an embodiment of the present disclosure, the control receiving module receives the first current sensing value fed back by the at least one first sensing device and the second current sensing value fed back by the at least one second sensing device that are sent from the sense sending module. The control receiving module generates at least one first control instruction according to the first current sensing value fed back by the at least one first sensing device and a predetermined first target sensing value of the at least one first sensing device. The control receiving module generates at least one second control instruction according to the second current sensing value fed back by the at least one second sensing device and a predetermined second target sensing value of the at least one second sensing device. The control receiving module sends the at least one first control instruction and the at least one second control instruction to the control sending module. The control sending module receives the at least one first control instruction and the at least one second control instruction that are sent from the control receiving module, and sends the at least one first control instruction and the at least one second control instruction to the execution device through the slave computer.

At block S402, the master computer generates the control instruction according to the current sensing value fed back by the sensing device and the predetermined target sensing value of the sensing device, and sends the control instruction to the execution device of the unmanned engineering machinery through the slave computer.

In an embodiment of the present disclosure, the master computer includes a control receiving module and the control sending module. The control receiving module receives the current sensing value fed back by the sensing device sent from the sense sending module. The control receiving module generates the control instruction according to the current sensing value fed back by the sensing device and the predetermined target sensing value of the sensing device. The control receiving module sends the control instruction to the control sending module. The control sending module receives the control instruction sent from the control receiving module, and sends the control instruction to the execution device.

At block S403, the execution device performs a control operation corresponding to the control instruction on the unmanned engineering machinery.

In an embodiment of the present disclosure, when an output value of the control instruction is a first output value, the execution device opens an electromagnetic valve in the unmanned engineering machinery, and when the output value of the control instruction is a second output value, the execution device closes the electromagnetic valve in the unmanned engineering machinery. Alternatively, when the output value of the control instruction is a first output value, the execution device closes the electromagnetic valve in the unmanned engineering machinery, and when the output value of the control instruction is a second output value, the execution device opens the electromagnetic valve in the unmanned engineering machinery.

Embodiments of the present disclosure provide the control system of the unmanned engineering machinery. Firstly, the slave computer receives the current sensing value fed back by the sensing device in the unmanned engineering machinery, and sends the current sensing value fed back by the sensing device to the master computer. And then, the master computer generates the control instruction according to the current sensing value fed back by the sensing device and the predetermined target sensing value of the sensing device, and sends the control instruction to the execution device through the slave computer. Finally, the execution device performs the control operation corresponding to the control instruction on the unmanned engineering machinery. Generally, a control system of an existing unmanned engineering machinery include: an encoder and a controller. The encoder may be installed in each part of the working device and the slewing device of the unmanned engineering machinery. When the encoder is installed, each part needs to be processed and modified, which may greatly affect the performance of the engineering machinery and reduce the accuracy of the control system. Consequently, compared with the related art, the control system of the unmanned engineering machinery provided in the embodiments of the present disclosure may improve the accuracy of the control system, convenience of installation and operation reliability. In addition, technical solutions according to embodiments of the present disclosure are simple to be implemented and easy for popularization, and have a wider application range.

It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A control system of an unmanned engineering machinery, comprising: a slave computer, a master computer and an execution device;
wherein, the slave computer is configured to receive a current sensing value fed back by a sensing device in the unmanned engineering machinery, and to send the current sensing value to the master computer, wherein the sensing device comprises: at least one first sensing device in a working device of the unmanned engineering machinery and at least one second sensing device in a slewing device of the unmanned engineering machinery;
the master computer is configured to generate a control instruction according to the current sensing value and a predetermined target sensing value of the sensing device, and to send the control instruction to the execution device through the slave computer; and
the execution device is configured to perform a control operation corresponding to the control instruction on the unmanned engineering machinery.

2. The system according to claim 1, wherein the slave computer comprises: a sense receiving module and a sense sending module;
wherein, the sense receiving module is configured to receive the current sensing value, and to send the current sensing value to the sense sending module; and the sense sending module is configured to receive the current sensing value sent from the sense receiving module, and to send the current sensing value to the master computer.

3. The system according to claim 2, wherein the master computer comprises: a control receiving module and a control sending module;
   wherein, the control receiving module is configured to receive the current sensing value sent from the sense sending module, to generate the control instruction according to the current sensing value and the predetermined target sensing value of the sensing device, and to send the control instruction to the control sending module; and
   the control sending module is configured to receive the control instruction sent from the control receiving module, and to send the control instruction to the execution device.

4. The system according to claim 2, wherein
   the sense receiving module is configured to receive a first current sensing value fed back by the at least one first sensing device and a second current sensing value fed back by the at least one second sensing device, and to send the first current sensing value and the second current sensing value to the sense sending module; and
   the sense sending module is configured to receive the first current sensing value and the second current sensing value sent from the sense receiving module, and to send the first current sensing value and the second current sensing value to the master computer.

5. The system according to claim 4, wherein
   the control receiving module is configured to receive the first current sensing value and the second current sensing value sent from the sense sending module, to generate at least one first control instruction according to the first current sensing value and a predetermined first target sensing value of the at least one first sensing device, to generate at least one second control instruction according to the second current sensing value and a predetermined second target sensing value of the at least one second sensing device, and to send the at least one first control instruction and the at least one second control instruction to the control sending module; and
   the control sending module is configured to receive the at least one first control instruction and the at least one second control instruction sent from the control receiving module, and to send the at least one first control instruction and the at least one second control instruction to the execution device through the slave computer.

6. The system according to claim 5, wherein the execution device comprises: a first execution device and a second execution device;
   the first execution device is configured to receive the at least one first control instruction sent from the control sending module through the slave computer, to perform a control operation corresponding to the at least one first control instruction on the working device of the unmanned engineering machinery, in which the first control instruction comprises: a first opening control instruction and a first closing control instruction; and
   the second execution device is configured to receive the at least one second control instruction sent from the control sending module through the slave computer, to perform a control operation corresponding to the at least one second control instruction on the slewing device of the unmanned engineering machinery, in which the second control instruction comprises: a second opening control instruction and a second closing control instruction.

7. The system according to claim 6, wherein, the first execution device is configured to open an electromagnetic valve in the working device of the unmanned engineering machinery when an output value of the at least one first control instruction is a first output value, and to close the electromagnetic valve in the working device of the unmanned engineering machinery when the output value of the at least one first control instruction is a second output value; or
   the first execution device is configured to close the electromagnetic valve in the working device of the unmanned engineering machinery when the output value of the at least one first control instruction is the first output value, and to open the electromagnetic valve in the working device of the unmanned engineering machinery when the output value of the at least one first control instruction is the second output value.

8. The system according to claim 6, wherein,
   the second execution device is configured to open an electromagnetic valve in the slewing device of the unmanned engineering machinery when an output value of the at least one second control instruction is a first output value, and to close the electromagnetic valve in the slewing device of the unmanned engineering machinery when the output value of the at least one second control instruction is a second output value; or
   the first execution device is configured to close the electromagnetic valve in the slewing device of the unmanned engineering machinery when the output value of the at least one second control instruction is the first output value, and to open the electromagnetic valve in the slewing device of the unmanned engineering machinery when the output value of the at least one second control instruction is the second output value.

9. The system according to claim 1, wherein the at least one first sensing device comprises a first draw-wire displacement sensor, a second draw-wire displacement sensor and a third draw-wire displacement sensor, the at least one second sensing device comprises a rotating potentiometer; the first draw-wire displacement sensor is arranged at a first joint of the working device of the unmanned engineering machinery, the second draw-wire displacement sensor is arranged at a second joint of the working device of the unmanned engineering machinery, the third draw-wire displacement sensor is arranged at a third joint of the working device of the unmanned engineering machinery, and the rotating potentiometer is arranged at a specific joint of the slewing device of the unmanned engineering machinery.

10. A control method of an unmanned engineering machinery, comprising:
    receiving, by a slave computer of the unmanned engineering machinery, a first current sensing value fed back by at least one first sensing device in a working device of the unmanned engineering machinery and a second current sensing value fed back by at least one second sensing device in a slewing device of the unmanned engineering machinery;
    sending, by the slave computer, the first current sensing value and the second current sensing value to a master computer of the unmanned engineering machinery;
    generating, by the master computer, a control instruction according to the current sensing value and a predetermined target sensing value of the sensing device;

sending, by the master computer, the control instruction to an execution device of the unmanned engineering machinery through the slave computer; and performing, by the execution device, a control operation corresponding to the control instruction on the unmanned engineering machinery.

11. The method according to claim 10, wherein performing, by the execution device, the control operation corresponding to the control instruction on the unmanned engineering machinery comprises:

when an output value of the control instruction is a first output value, opening, by the execution device, an electromagnetic valve in the unmanned engineering machinery; and when the output value of the control instruction is a second output value, closing, by the execution device, the electromagnetic valve in the unmanned engineering machinery.

12. The method according to claim 10, wherein performing, by the execution device, the control operation corresponding to the control instruction on the unmanned engineering machinery comprises:

when the output value of the control instruction is the first output value, closing, by the execution device, the electromagnetic valve in the unmanned engineering machinery; and when the output value of the control instruction is the second output value, opening, by the execution device, the electromagnetic valve in the unmanned engineering machinery.

13. The method according to claim 10, wherein, generating, by the master computer, a control instruction according to the current sensing value and a predetermined target sensing value of the sensing device, comprising:

generating at least one first control instruction according to the first current sensing value and a predetermined first target sensing value of the at least one first sensing device; and generating at least one second control instruction according to the second current sensing value and a predetermined second target sensing value of the at least one second sensing device;

sending, by the master computer, the control instruction to an execution device of the unmanned engineering machinery through the slave computer, comprising:

sending, by the master computer, the at least one first control instruction and the at least one second control instruction to the execution device through the slave computer.

14. The method according to claim 13, wherein performing, by the execution device, a control operation corresponding to the control instruction on the unmanned engineering machinery, comprising:

performing a control operation corresponding to the at least one first control instruction on the working device of the unmanned engineering machinery, the first control instruction comprises: a first opening control instruction and a first closing control instruction; and performing a control operation corresponding to the at least one second control instruction on the slewing device of the unmanned engineering machinery, the second control instruction comprises: a second opening control instruction and a second closing control instruction.

* * * * *